United States Patent [19]

Hill

[11] Patent Number: 4,459,721

[45] Date of Patent: Jul. 17, 1984

[54] POULTRY SKINNING MACHINE

[76] Inventor: William J. Hill, P.O. Box 230, Ball Ground, Ga. 30107

[21] Appl. No.: 458,840

[22] Filed: Jan. 18, 1983

[51] Int. Cl.³ .............................................. A22C 21/00
[52] U.S. Cl. .......................................... 17/11; 17/21; 17/50; 99/585
[58] Field of Search ................. 17/11, 21, 50; 99/584, 99/585, 589

[56] References Cited

U.S. PATENT DOCUMENTS

| | | | | |
|---|---|---|---|---|
| 3,368,598 | 2/1968 | Nakano | | 99/585 |
| 3,480,991 | 12/1969 | Edwards, Sr. | | |
| 3,769,903 | 11/1973 | Greider | | 99/589 |
| 3,844,207 | 10/1974 | Townsend | | 99/589 |
| 4,325,165 | 4/1982 | De Long | | 17/11 |

FOREIGN PATENT DOCUMENTS

| | | | |
|---|---|---|---|
| 0059517 | 9/1982 | European Pat. Off. | 17/11 |
| 13553 | 3/1925 | Netherlands | 99/585 |

*Primary Examiner*—Nicholas P. Godici
*Assistant Examiner*—Kurt Rowan
*Attorney, Agent, or Firm*—Niro, Daleiden & Jager

[57] ABSTRACT

A poultry skinning machine for removing the skin from poultry parts utilizes rollers having inter-engaging helical teeth that laterally transport the poultry parts while removing the skin from the product. The rollers act in cooperation with a cover means having a shearing section disposed in a substantially bearing relationship along at least a portion of the rollers adjacent their ends. The shearing section facilitates separating the product from detaching skin whereby roller clogging is avoided by directing skin through a receiving gap formed between end bearing means. The skinned product is at the same time conveyed atop the closely fitting shear section.

11 Claims, 3 Drawing Figures

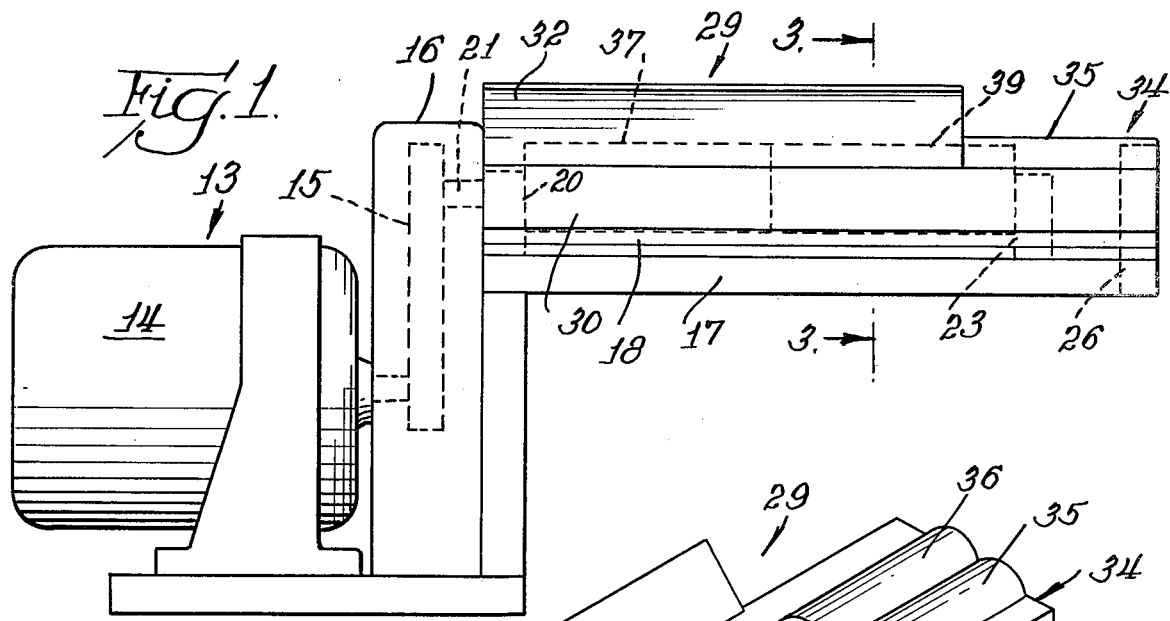
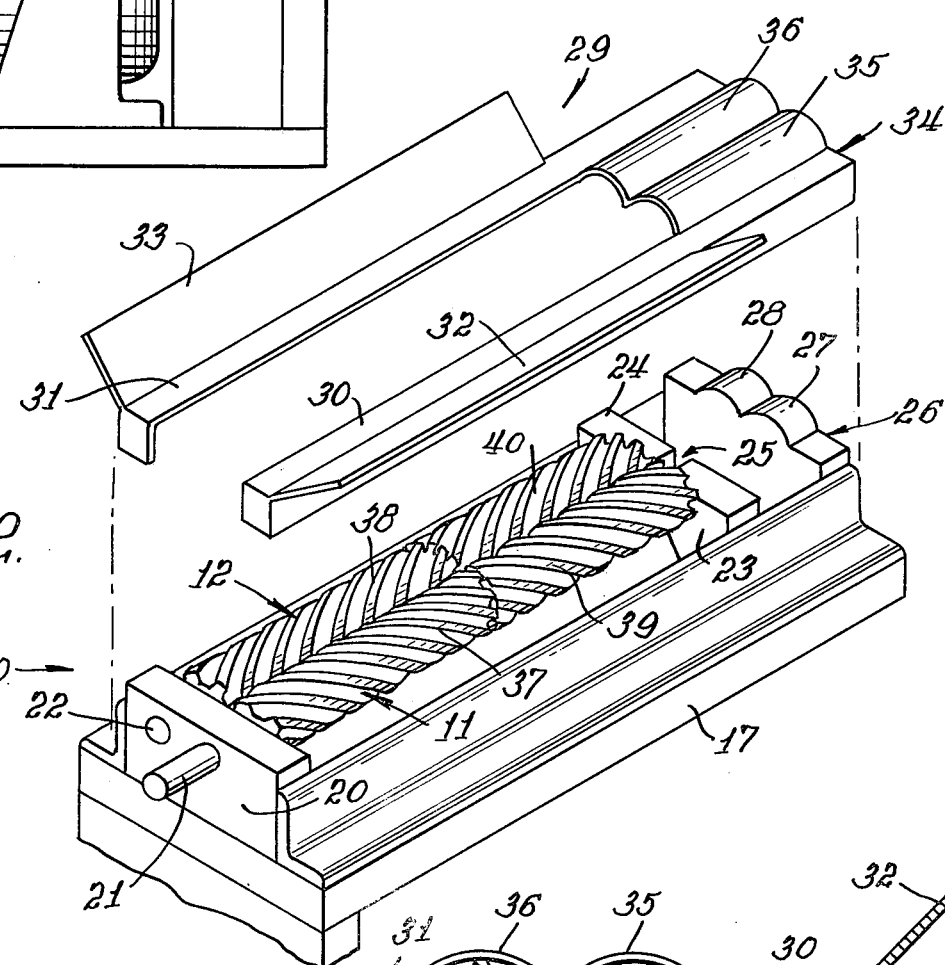
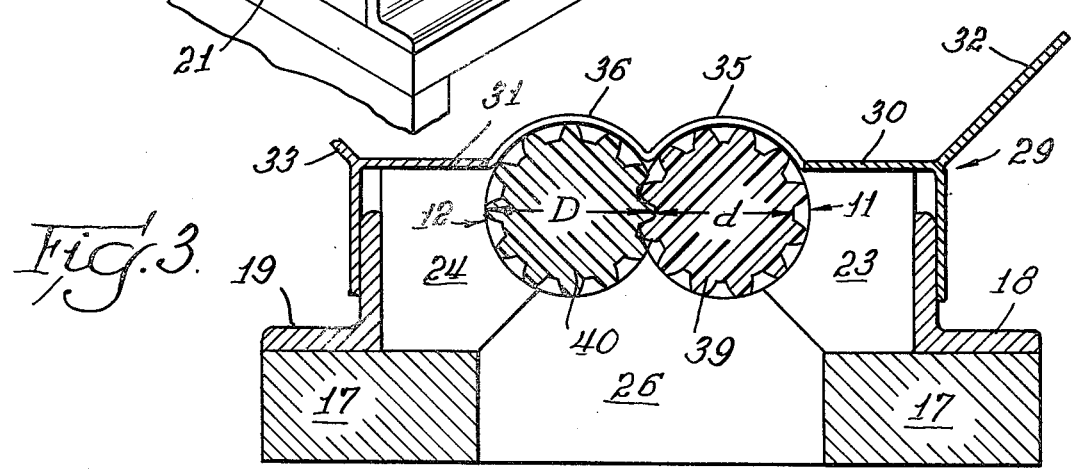

POULTRY SKINNING MACHINE

BACKGROUND AND SUMMARY OF THE INVENTION

This invention relates generally to a machine for removing the skin from poultry pieces rapidly, and in an efficient manner.

The processing of poultry, particularly segmented pieces sold to consumers, requires careful skin removing procedures so that the meat is not damaged. Yet, a great deal of time cannot be spent skinning the pieces in order to keep production costs as low as possible.

In the past, machinery for the automatic processing of poultry gizzards has found wide acceptance. In order to remove the gut and stomach, peeling rolls have been employed. Examples of this type machinery are disclosed in U.S. Pat. Nos. 4,073,040, and 4,057,875, issued to Carl J. Hill. Such gizzard processing machines typically used peeler rolls to remove the lining from a slit and opened gizzard. Examples of these peeler roller are shown in U.S. Pat. No. 3,119,144 to Carl J. Hill and U.S. Pat. No. 3,480,991 to J. C. Edwards, Sr.

These peeling-type devices for poultry gizzards involve pairs of rotating rolls having helical teeth upon which the gizzard is placed. The rolls rotate in opposite directions and draw the lining between them. In U.S. Pat. No. 3,119,144, two inter-engaging rollers are used. Each roller has two segments with reversed spiral gearing. One is a driver roll that is linked to a motor. The driver roller turns the second, or follower, roller. With the reversed gears of each roller, the poultry gizzard is maintained in a central location along the rollers rather than being carried by them. As the rollers rotate, the teeth grab the lining and draw it below to thereby leave the gizzard clean.

U.S. Pat. No. 4,073,040, involves another gizzard processing machine utilizing peeler rollers with helical gears. The rollers peel the lining from the gizzard after other pairs of rollers have removed the stomach from the gizzard. The peeling rollers have inter-engaging helical teeth, and remove the lining from the gizzard in a last step provided by the machine. The peeling action is aided by a set of reciprocating pusher bars which move the gizzards back and forth across the peeling rollers.

It has heretofore been difficult to apply the processes and machinery for removing the linings from gizzards directly and efficiently to the skinning of other poultry pieces. A difficulty with skinning poultry pieces, e.g., legs, breasts, thighs and wings, is that while the meat is firm, it is subject to scarring or being "chewed-up" by roller-type devices. Since the poultry pieces should be presented to the consumer in an undamaged condition, the scarring of the poultry meat is deleterious to the product. Conventional gizzard peeling rolls are designed for removing the lining which is attached to the gizzard in a much different physiological manner than skin and does not require the care needed for removing skin from poultry pieces. With gizzards, scarring usually is not a problem because they are relatively tough and deformable, and can sustain rough peeling operations without concern for damage. On the other hand, the machinery for removing skin must delicately, but effectively, separate the meat and the skin.

One problem in attempting to adapt gizzard peeling rollers for use with poultry pieces is that the rollers cannot be too small such that the nip between the rollers forms a very shallow V. With small rollers, sometimes found in gizzard peeling devices, the nip is so shallow that the skin is not effectively grabbed. With rollers that are too large, the nip is accordingly deeper but this has been found to chew up the meat due to the deeper nip between rollers.

Additional problems involve the separation of the skinned piece from the detaching skin. It is very desirable that the meat be separated from the skin on an automatic high-speed basis. Moreover, it must be accomplished in such a manner that the skin is not ground up by the skinning rollers. If this occurs, the rollers may clog, and render the skinning machine ineffective, as well as creating additional cleanup and collection problems. Further, the skin must not be allowed to back up at the ends of the rollers to interfere with removal of the skinned piece. It is desirable to remove the skin with clean separation from the product. Poultry skin has other uses in the industry, and a skinning machine should include means for its efficient collection.

Accordingly, it is a primary object of the invention to provide a machine for skinning poultry pieces, or parts, which utilizes rollers having inter-engaging helical teeth that gently but effectively remove the skin without scarring or chewing up the meat.

It is an allied goal of the invention to remove the skin without clogging the rollers or interfering with removal of the skinned part.

It is a further object of the invention to provide a poultry skinning machine in which the operator simply places the poultry part onto a pair of rollers having inter-engaging helical teeth whereby the skin is removed without chewing the meat and the skinned poultry part is lifted and removed from the rollers by the action of a shearing section located over the rollers adjacent their ends.

It is a further goal of the invention to provide a pair of interengaging rollers in which each roller has a first portion with hard teeth and a second portion with softer teeth, wherein the first portion firmly grips the skin, and the second more softly nips and removes any remaining small bits of skin from the product without scarring the meat.

It is yet another object of the invention to provide a poultry skinner in which self-cleaning inter-engaging rollers dispose removed skin downwardly between the rollers without clogging and skin particles are prevented from collecting at the ends of the rollers wherein the poultry part is moved upwardly by a shear means so that complete separation of the skin and meat is effected.

Briefly stated, the invention may be summarized as comprising a framework having opposing bearing block means supporting therebetween a pair of inter-engaging rollers having helical teeth. A motor drives the drive shaft of one roller and the second roller is driven by the first. The rollers revolve in opposite directions. The action of the helical teeth transport the poultry part while pulling the skin downwardly away from the meat. At the end of the rollers a shearing section of a cover means separates the poultry part from the detached skin. Bearing block means below the shearing section is gapped to receive detached skin, and prevent it from collecting at the end of the rollers and clogging them. The skinned product is lifted on top of the shearing section by the separating action which permits the product to be quickly removed from the rollers rather than remaining on them where scarring might occur. Each roller preferably has two teeth portions. The first portions are hard teeth, preferably stainless steel, which firmly bite the poultry skin. The second portions comprise teeth cut from a comparatively softer material, such as a high density plastic, whereby these teeth are characterized by their more delicate gripping action and serve to accomplish a final cleaning of small skin remnants without unduly nipping the meat. The shear section of the cover means is shape-conforming with the rollers and is in close tolerance relationship with the softer second teeth adjacent the ends of the rollers. The shear section snugly fits over the rollers in as close to a zero clearance fit as mechanically possible. The poultry part is lifted on top of the cover plate by the advancing action of the rollers while any remaining or detaching skin is sheared off. A roller cleaning action is also obtained by the scraping action of the shear section on the rollers. The gap in the end bearing blocks receive any scraped skin particles to prevent a clogging build-up at the end of the rollers.

DESCRIPTION OF AN ILLUSTRATIVE EMBODIMENT

Further objects and features of the present invention will become apparent from a description of an illustrative embodiment thereof, taken in conjunction with the accompanying drawings in which:

FIG. 1 is an elevational view of the poultry skinning machine embodying the features and advantages of the present invention;

FIG. 2 is a perspective view, partially exploded, of the embodiment of FIG. 1; and, FIG. 3 is a cross-sectional view of FIG. 1 taken along line 3—3 looking in the direction of the arrows.

The embodiment shown in the Figures includes a frame 10, a pair of inter-engaging rollers 11-12 and power means 13. For purposes of illustration, power means 13 comprises a 350 RPM, ⅛ H.P., gearhead motor 14, which drives roller 11 by means of a gear belt 15 residing within housing 16. Such power means for driving a roller are well known and will not be further described.

Frame 10 comprises a base 17, which is generally rectangular in shape and has affixed thereto a pair of parallel L angles 18-19. As seen in FIG. 3, base 17 is centrally open below rollers 11-12 allowing removed skin to drop into a collection bin or the like positioned below the frame. Bearing block 20 is transversely positioned between angles 18-19 and journals rotatable shafts 21-22 of rollers 11-12, respectively. Shaft 21 is the motor driven shaft and is linked with gear belt 15 in a conventional manner within housing 16. At the opposite ends of rollers 11-12, bearing blocks 23-24 are also transversely positioned between angles 18-19 and respectively journal shafts 21-22. As depicted in FIGS. 2 and 3, bearing blocks 23-24 do not meet but instead are separated by a gap 25 which is centrally aligned between rollers 11-12.

Bearing blocks 23-24 are spaced from the right end of base 17, as best seen in FIG. 1. At the right end, or the end opposite power means 13, a support block 26 is located transversely between angles 18-19. Support block 26 includes generally hemi-cylindrical shaped bearing surfaces 27-28, having radii equal to the external radii of rollers 11-12, and being coaxially aligned with the long axes of rollers 11-12, respectively.

A thin cover means 29, which in the illustrated embodiment comprises 16 gauge stainless steel, is supported by frame 10. The cover 29 includes L-shaped long shoulders 30-31, as shown in FIG. 3, which each have a length sufficient to extend from bearing block 20 to support block 26. Oblique flanges 32-33 form a part of the cover means and project upwardly and outwardly from shoulders 30-31, and extend therealong for a distance substantially equal to the length of the rollers. In the disclosed embodiment, flanges 32-33 terminate generally at bearing blocks 23-24, but may extend for the full length of cover means 29, if desired. Horizontal flanges of L-shaped shoulders 30-31 extend inwardly to almost contact rollers 11-12, as illustrated in FIG. 3, which thereby generally defines a skinning bed extending from flange 32 on one side to flange 33 at the other side. Poultry parts can thereby be quickly directed to the rollers.

A portion of cover means 29 comprises a shear section 34 which extends over rollers 11-12 near their ends in a bearing, or near-bearing, relationship with the rollers. Shear section 34 is integrally formed with shoulders 30-31 and consists of a pair of arches 35-36 having substantially the same radii as bearing surfaces 27-28 and external radii of rollers 11-12. As the skinned product approaches the end of the rollers, effective removal is desired to shift the piece off of the rollers to avoid any possibility of scarring the exposed meat and further to separate any hanging or detaching skin which may remain on the product. Therefore, a close tolerance fit is important to effect a shearing, or separating, action on the poultry piece. The perfect bearing relationship, of course, would be a zero clearance fit. But clearance of up to about 0.010 inches offers an effective range. The clearance may be slightly greater and yet achieve satisfactory results depending on the size of the product and the roller speed, diameter and teeth pitch.

Cover means 29 is snugly held in place by means of shoulders 30-31 resting on bearing block 20, bearing blocks 23-24, and support block 26. Shoulders 30 further overlap angles 18-19 along substantially their full length. Arches 35-36 nest-engage support surfaces 27-28, adding extra rigidity and stability for shear section 35. However, cover means 29 is easily removed by an upward lifting movement to facilitate cleaning and access to the rollers.

In the illustrated embodiment, rollers 11-12 are substantially mirror images. In preferred form each roller has two teeth sections of equal length and pitch. Equal length, however, is not critical. Roller 11 has a first section of metal teeth 37 which gear-engage a first section of metal teeth 38 on roller 12. In the disclosed embodiment, the metal is stainless steel. The second sections of teeth on rollers 11-12 comprise teeth 39-40, respectively. These second teeth are cut from a softer material, preferably a low friction, high density, plastic. Delrin, 101 Nylon and high density polyethylene, have been found suitable. Similarly, helical teeth 39-40 are also gear-engaged.

It has been discovered that the initial skinning of a poultry part is better served by the use of metal teeth. The sharp gripping effect of metal teeth takes off the major portion of the skin from a poultry leg, thigh, breast, etc. Stainless steel teeth, for example, also have long wear life in this environment. The helical teeth form herringbone V-shapes which point generally to the left (FIG. 2). As they counter-revolve a poultry piece is transferred to the right from the harder teeth sections 37-38 onto the softer helical teeth 39-40. These softer teeth more delicately remove fragments and small remnants of skin. After the major portion of the skin is removed by the metal teeth, the meat becomes exposed to the rollers. It is therefore prudent to reduce the risk of scarring by minimizing further contact with harder teeth once the majority of the skin is detached. This will enhance the yield of the machine and satisfy the preference of consumers.

In the preferred embodiment, the plastic teeth 39-40 act as a bearing surface for the portion of metal shear section 34 extending onto the rollers 11-12. The bearing contact of a stainless steel shear section 34 on softer plastic teeth 39-40 minimizes abrasion and friction therebetween for long wear life and maintenance of the close tolerance fit for effective shearing action.

While the diameters of the rollers are not critical, for purposes of illustration, the major diameter D, as shown in FIG. 3, is 1.050 inches in the disclosed embodiment. The minor diameter d of 0.890. The helical teeth of both the metal and plastic sections therefore have a depth of 0.160 inches. While the invention is not so limited, it has been found that teeth having 26 pitch for these diameters are very effective. Pitch, depth, and roller diameter values may be varied to achieve a desired gripping action. The size of the V-groove, or nip, between the rollers is a function of these values, and if too shallow the skin will not be gripped. If too deep, the product will be drawn between the rollers and subjected to chewing by the teeth.

In one alternate form of the invention, rollers 11-12 may have all metal teeth extending for the full length of the rollers when the sharper gripping effect of metal is desired along the entire skinning path. It will be understood that reducing the pitch and depth of the helical teeth will also reduce the gripping action, if such is desired. In this alternate embodiment, shear section 34 preferably comprises a low friction, high density, plastic in order to bear on the metal teeth with minimal abrasion and maintain a close tolerance fit for proper shear action.

In another alternate form, the rollers may include all plastic teeth when a softer nipping action is desired along the entire skinning path. Increasing the pitch and depth of the helical teeth will also serve to increase the gripping action, if desired. This alternate can utilize stainless steel cover means 29 in the same manner as described for the illustrative embodiment above.

In operation, most of the removed skin is deposited below the rollers through a central opening in base 17, as shown in FIG. 3. Helical teeth 37-40 are self-cleaning as they rotate, and grind the detached skin to transfer skin particles below. The product is carried on top of the rollers toward end bearing blocks 23-24.

Roller maintenance is minimal due to the self-cleaning action. As the product nears the end of the rollers, any remaining skin pieces, which may be hanging from the product or carried by the rollers, are prevented from collecting at the end of the rollers by the provision of gap 25 formed between bearing blocks 23-24. This gap receives the skin remnants which may be present at the ends of the rollers.

As the product nears end bearing blocks 23-24, it encounters shear section 34, which extends along a portion of the soft teeth portions 39-40 of the rollers. Shear section 34 separates hanging skin pieces from the product by urging and lifting the product upwardly on top of arches 35-36, while the skin is subjected to the downwardly gripping action of the teeth and forced to go through gap 25. A clean separating, or shearing, action is thus provided by the inventive skinning machine. The skinned poultry product is then ready to be taken from atop the shear section for other processing operations.

It will be appreciated that shear section 34 acts to not only separate the product from any partially attached skin but, because of the close tolerance bearing relationship, further serves to scrape the rollers clean adjacent end bearing blocks 23-24. Particles of skin which may be present are thereby loosened and transferred through gap 24. Shear section 34, in the illustrative embodiment, extends for about one inch along rollers 11-12. This dimension is not critical but the shear section should extend along at least some portion at the end of travel along the rollers so that the conveyed poultry piece and skin are separated by the shear action before reaching the end of the rollers.

Accordingly there has been provided a poultry skinning machine for removing the skin from poultry parts by the use of rollers having interengaging helical teeth that remove the skin from the product in cooperation with a shearing cover means at the end of travel along the rollers. A shear section of the cover means separates the product and skin adjacent the end of the rollers. The skinning machine processes poultry parts with greatly reduced chance of scarring. The teeth on the rollers grip and grind the skin as the product is conveyed therealong. The engaging teeth are substantially self-cleaning and skin which is finally detached adjacent the ends of the rollers is prevented from clogging the rollers by a scraping action of the shear section. An efficient transference of the skin is achieved through a gap between bearing blocks journalling end shafts of the rollers. While the skin is forced through the gap the product is sheared from the skin and is urged, or lifted, by the conveying action of the helical teeth on top of the shear section of the cover means. The removed skin and cleaned poultry product are then ready to be subsequently processed.

What is claimed is:

1. An apparatus for skinning poultry parts comprising:
   a frame;
   a pair of counter-revolving rollers including shaft means and having inter-engaging helical teeth, one roller shaft means being driven by power means to drive the other;
   bearing means journalling shafts of the rollers, said bearing means being mounted on the frame;
   cover means open above the rollers and supported by the frame, said cover means including shear section means adjacent an end of the rollers;
   means mounted on said frame for supporting said cover means;
   said helical teeth inter-engaging to convey poultry parts therealong toward said shear section means;
   said shear section means extending partially over said rollers and having roller-conforming portions associating in a substantially bearing relationship with the rollers;
   whereby said apparatus is adapted for removing skin from poultry products and capable of transferring detached skin below the shear section means and said skinned poultry part above the shear section means.

2. The apparatus as in claim 1 wherein said rollers each have first and second segments of helical teeth formed of different materials wherein corresponding segments are coextensive.

3. The apparatus as in claim 2 wherein the first segments comprise metal teeth and the second segments comprise plastic teeth.

4. The apparatus as in claim 3 wherein the metal comprises stainless steel.

5. The apparatus as in claim 3 wherein the metal segments of teeth and the plastic segments of teeth each extend for about one-half the length of each roller.

6. The apparatus as in claim 1 or 3 wherein bearing means journalling ends of the rollers adjacent the shear section means for a gap between the rollers.

7. The apparatus as in claim 6 wherein bearing block means at the roller ends opposite said shear section means extend across said frame and said bearing means adjacent said shear section means comprises two spaced-apart bearing blocks forming said gap therebetween, said gap aligned with the line of inter-engagement between said rollers.

8. The apparatus as in claim 1 wherein the means for supporting the cover means includes a support block extending transversely to the longitudinal axes of the rollers.

9. The apparatus as in claim 8 wherein said support block includes raised bearing surface portions conforming to the shape of the roller-conforming portions of the shear section means.

10. A poultry skinner comprising:
a pair of counter-revolving rollers, the rollers having inter-engaging helical teeth and being journaled at opposite ends in bearing block means supported by a frame;
a cover means having longitudinally extending shoulders supported adjacent and along the sides of the rollers and further having outwardly and upwardly extending flanges extending from said shoulders for substantially the full length of the rollers, said cover means further including at one end thereof a shear section means being shape-conforming to the rollers wherein the shear section means resides in a substantially bearing relationship with the rollers along portions adjacent one end thereof;
said helical teeth cooperating in a manner whereby a poultry piece is conveyed therealong in a direction toward the shear section means;
bearing block means at said one end of said rollers being disposed below said shear section means and comprising spaced-apart bearing blocks forming a gap therebetween for receiving detached skin therethrough whereby skin is transferred below the shear section and the skinned poultry part is transferred above the shear section; and
a support block included on said frame and having a shape conforming to the shear section means and being positioned below and in supporting engagement with the shear section means.

11. A poultry skinner in accordance with claim 10 wherein the portions of said rollers adjacent said one end, at which said bearing section means resides in substantially bearing relationship, have helical teeth made of a high density low friction plastic material.

* * * * *